O. H. ELVENESS.
COUPLING.
APPLICATION FILED APR. 20, 1917.

1,248,294.

Patented Nov. 27, 1917.

WITNESSES
J. E. Logan
Rodney M. Smith

INVENTOR
O. H. Elveness

BY Victor J. Evans
ATTORNEY

UNITED STATES PATENT OFFICE.

OLE H. ELVENESS, OF PORTLAND, OREGON.

COUPLING.

1,248,294.   Specification of Letters Patent.   Patented Nov. 27, 1917.

Application filed April 20, 1917. Serial No. 163,464.

*To all whom it may concern:*

Be it known that I, OLE H. ELVENESS, a subject of the Kingdom of Norway, residing at Portland, in the county of Multnomah and State of Oregon, have invented new and useful Improvements in Couplings, of which the following is a specification.

This invention relates to couplings or unions for pipes and similar objects and aims to provide a simple and quickly operable device for connecting a pair of threaded members.

One of the objects of the invention resides in the provision of a coupling having a pair of nuts connected by a binding or coupling screw, the screw seating in one of the nuts and threadedly engaging the other nut.

Another object of the invention is to provide a union which may be manufactured in different sizes at a relatively low cost, which will prove a great time saver and which will be better looking than the customary sleeves now used.

With these and other objects in view as will become more apparent as the description proceeds, the invention consists in certain novel features of construction, combination and arrangement of parts as well be hereinafter fully described, illustrated and claimed.

Figure 1:
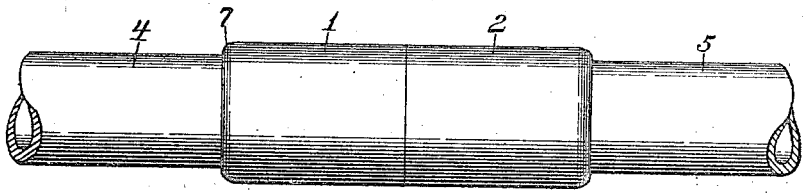
Figure 1 is a side elevation showing my improved coupling uniting a pair of pipes.
Figure 2:
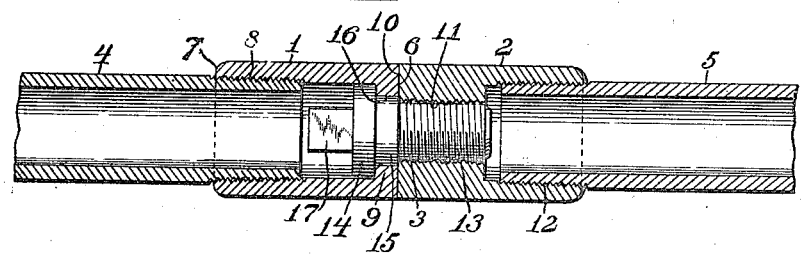
Fig. 2 is a longitudinal sectional view through Fig. 1.
Figure 3:
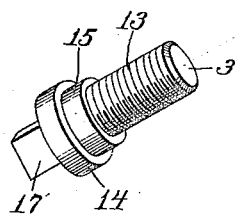
Fig. 3 is a perspective view of the coupling screw.

Referring in detail to the drawings by numerals, 1 and 2 designate coupling nuts, 3 the binding or coupling screw and 4, 5 pipes which are joined by the union. The nut 1 is in the form of a sleeve having a squared inner end 6 and having its outer face slightly rounded or beveled adjacent the other end as at 7. The nut is internally threaded as at 8 for a portion of its length and is formed on its inner end with an annular interior flange 9 which acts as a seat for the head of the binding screw.

The nut 2 has an external appearance similar to the nut 1, has its inner end 10 squared and is of a restricted internal diameter for a portion of its length adjacent its inner end. The restricted portion is internally threaded as indicated by the numeral 11 and the unrestricted portion is threaded as at 12.

The binding or coupling screw 3 has a threaded shank 13 which communicates with the threads 11 and is provided with a head 14, and an external diameter slightly less than the internal diameter of the nut 1. The head has a diametrically reduced inner portion 15 which fits snugly within the seat 16 formed in the flange 9. A wrench engaging extension 17 is formed on the outer face of the head in alinement with the shank.

The coupling nuts may be drawn tightly together and securely held by the screw 3 so as to join the pipes 4 and 5.

This coupling will be very useful in connecting pipes and rods, for all kinds of railing, frames, and similar structures.

From the foregoing description taken in connection with the accompanying drawings, it will be seen that my coupling is very practical, simple and commercially desirable.

While I have shown and described the preferred embodiments of my invention it will be clearly understood that I do not wish to be limited to this construction, but may make such changes as will fall within the scope and spirit of the invention as claimed.

What I claim is:

1. A coupling of the character described, comprising a pair of nuts internally threaded, a seat formed in one of said nuts, the other nut being provided with an internally reduced threaded portion, and a binding screw having a head engaging said seat and a threaded shank for engagement with the threaded reduced portion of the other nut.

2. A coupling comprising a pair of sleeve nuts having their opposed ends squared, one of said nuts being formed adjacent its inner end with an internal flange forming a seat, the other nut being of a reduced diameter adjacent its inner end and threaded along said reduced portion, and a coupling screw having a head seated in said seat and a threaded shank engageable with the reduced threaded portion of the other nut, said head being formed on its outer face with a wrench engaging projection.

3. A coupling comprising a pair of sleeve like nuts, one of said nuts being internally threaded adjacent its outer end for a portion of its length and of a restricted internal diameter adjacent its other end to provide a seat, the other nut being internally threaded adjacent its outer end and being of a reduced internal diameter adjacent its other end, and a coupling screw having a head of two external diameters to engage said seat, a shank externally threaded for engagement with the threaded restricted portion of the last named nut and a wrench engaging projection on the outer face of the head.

In testimony whereof I affix my signature.

OLE H. ELVENESS.

Witnesses:
E. P. SLOVARP,
DOMENICO GRANO.

Copies of this patent may be obtained for five cents each, by addressing the "Commissioner of Patents, Washington, D. C."